(12) United States Patent
Qiu et al.

(10) Patent No.: US 12,532,370 B2
(45) Date of Patent: Jan. 20, 2026

(54) SECONDARY CELL GROUP ACTIVATION/DEACTIVATION IN SPLIT NODE ARCHITECTURE

(71) Applicant: Telefonaktiebolaget LM Ericsson (publ), Stockholm (SE)

(72) Inventors: Liwei Qiu, Täby (SE); Nianshan Shi, Järfälla (SE); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 337 days.

(21) Appl. No.: 18/031,284

(22) PCT Filed: Oct. 13, 2021

(86) PCT No.: PCT/SE2021/051003
§ 371 (c)(1),
(2) Date: Apr. 11, 2023

(87) PCT Pub. No.: WO2022/086392
PCT Pub. Date: Apr. 28, 2022

(65) Prior Publication Data
US 2023/0379992 A1   Nov. 23, 2023

Related U.S. Application Data

(60) Provisional application No. 63/104,289, filed on Oct. 22, 2020.

(51) Int. Cl.
H04W 76/15   (2018.01)
H04W 16/32   (2009.01)

(52) U.S. Cl.
CPC ........... H04W 76/15 (2018.02); H04W 16/32 (2013.01)

(58) Field of Classification Search
CPC ..... H04W 76/15; H04W 16/32; H04W 76/27; H04W 72/04; H04W 16/28; H04L 69/14; H04B 7/08; H04B 7/0408; H04B 7/06
See application file for complete search history.

(56) References Cited

U.S. PATENT DOCUMENTS

2018/0368175 A1\* 12/2018 Jeon ................ H04W 72/04
2019/0357262 A1\* 11/2019 Cirik .................. H04W 72/04
(Continued)

FOREIGN PATENT DOCUMENTS

KR    20190143782        \* 12/2019
KR    20190143782 A       12/2019

OTHER PUBLICATIONS

NPL Document, NG-RAN; Architecture description (Release 16) France, Oct. 2020 (Oct. 2, 2020) (Year: 2020).\*
(Continued)

*Primary Examiner* — Mewale A Ambaye
(74) *Attorney, Agent, or Firm* — Murphy, Bilak & Homiller, PLLC

(57) ABSTRACT

Embodiments include methods for a first node that is configured for dual connectivity with a user equipment (UE) together with a second node of a wireless network. One of the first and second nodes provides a secondary cell group (SCG) for the UE. Such methods include a first unit of the first node receiving an indication of change in activation status of the SCG for the UE, and the first unit of the first node sending the indication of change in activation status to a second unit of the first node or to a first unit of the second node. Some variants include operations performed by the second unit of the first node. One of the first and second units can be a centralized unit (CU), while the other can be a
(Continued)

distributed unit (DU). Other embodiments include first unit and first node apparatus configured to perform such methods.

24 Claims, 6 Drawing Sheets

(56) References Cited

U.S. PATENT DOCUMENTS

| | | | |
|---|---|---|---|
| 2020/0053777 A1* | 2/2020 | Babaei | H04W 72/04 |
| 2020/0106663 A1 | 4/2020 | Yoo | |
| 2020/0313747 A1* | 10/2020 | Xu | H04B 7/0617 |
| 2020/0314664 A1* | 10/2020 | Zhou | H04B 7/0617 |
| 2023/0209538 A1* | 6/2023 | Cirik | H04W 72/231 |
| | | | 370/329 |

OTHER PUBLICATIONS

"3GPP TS 36.423 V16.2.0", 3rd Generation Partnership Project; Technical Specification Group Radio Access Network; Evolved Universal Terrestrial Radio Access Network (E-UTRAN); X2 application protocol (X2AP) (Release 16), Jul. 2020, pp. 1-489.

"3GPP TS 38.321 V16.2.0", 3rd Generation Partnership Project; Technical Specification Group Radio Access Network; NR; Medium Access Control (MAC) protocol specification (Release 16), Sep. 2020, pp. 1-107.

"3GPP TS 38.401 V16.3.0", 3rd Generation Partnership Project; Technical Specification Group Radio Access Network; NG-RAN; Architecture description (Release 16), Sep. 2020, pp. 1-78.

"3GPP TS 38.470 V16.3.0", ETSI TS 138 470 V16.3.0; 5G; NG-RAN; F1 general aspects and principles, Release 16, Nov. 2020, pp. 1-18.

"3GPP 23.501 V16.6.0", 3rd Generation Partnership Project; Technical Specification Group Services and System Aspects; System architecture for the 5G System (5GS); Stage 2 (Release 16), Sep. 2020, pp. 1-447.

"3GPP TS 38.300 V16.3.0", 3rd Generation Partnership Project; Technical Specification Group Radio Access Network; NR; NR and NG-RAN Overall Description; Stage 2 (Release 16), Sep. 2020, pp. 1-148.

"3GPP TS 38.425 V16.2.0", 3rd Generation Partnership Project; Technical Specification Group Radio Access Network; NG-RAN; NR user plane protocol (Release 16), Sep. 2020, pp. 1-25.

"3GPP TS 36.300 V16.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Jul. 2020, pp. 1-390.

"3GPP TS 38.423 V16.2.0", 3rd Generation Partnership Project; Technical Specification Group Radio Access Network; NG-RAN; Xn application protocol (XnAP) (Release 16), Jul. 2020, pp. 1-447.

"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.

"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.

"Views on NR Rel-17", 3GPP TSG RAN Meeting #84, RP-190919, Newport Beach, USA, Jun. 4, 2019, pp. 1-36.

"Report of 3GPP TSG RAN2#107bis meeting, Chongqing, China", 3GPP TSG-RAN WG2 meeting #108, R2-1914301, Oct. 14-18, 2019, pp. 1-283.

"Introducing suspension of SCG", 3GPP TSG RAN WG2 Meeting #107, R2-1908679, Prague, Czech, Aug. 26-30, 2019, pp. 1-4.

"Independent handling of SCG resume/suspend", 3GPP TSG-RAN WG2 #107, Tdoc R2-1910266, Prague, Czech Republic, Aug. 26-30, 2019, pp. 1-3.

"Support of dormancy SCG", 3GPP TSG-RAN2#108, R2-1914895, Reno, USA, Apr. 18-22, 2019, pp. 1-6.

"3GPP TS 38.473 version 16.3.1", ETSI TS 138 473 V16.3.1, 5G; NG-RAN; F1 Application Protocol (F1AP) (Release 16), Nov. 2020, pp. 1-459.

* cited by examiner

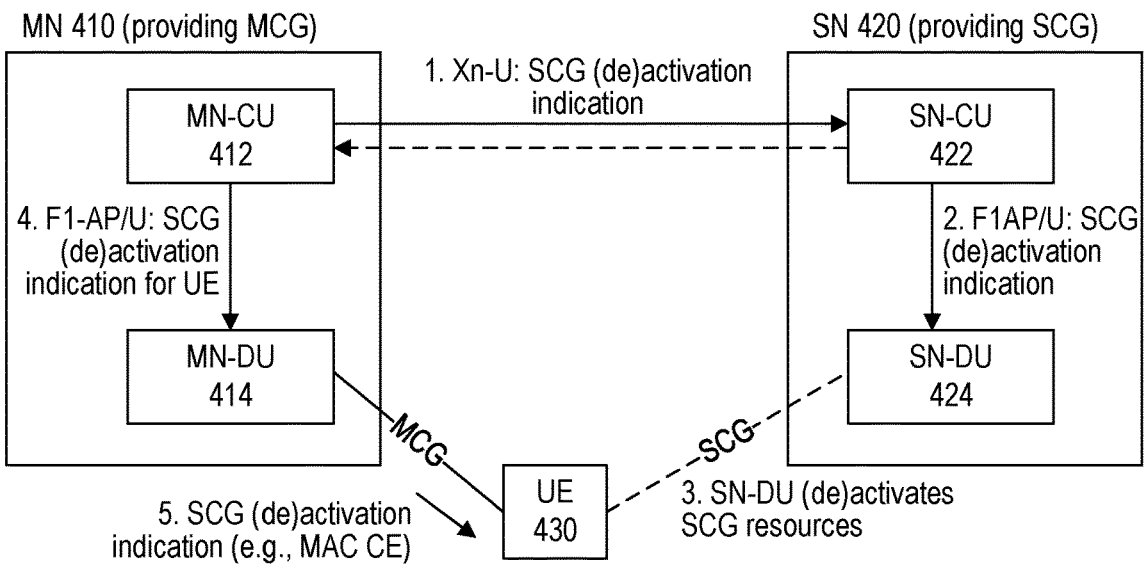

FIG. 5

| Bits | | | | | | | | Number of Octets |
|---|---|---|---|---|---|---|---|---|
| 7 | 6 | 5 | 4 | 3 | 2 | 1 | 0 | |
| PDU Type (=2) | | | | PDCP Dupl. Ind. | Assistance Info. Ind. | UL Delay Ind. | DL Delay Ind. | 1 |
| Spare | | | | | | SCG Activation Indication | PDCP Dupl. Activ. Suggestion | 1 |
| Number of Assistance Information Fields | | | | | | | | 0 or 1 |
| Assistance Information Type | | | | | | | | 0 or (2*Number of Assistance Info Fields + sum of Number of octets for Radio Quality Assistance Information Fields) |
| Number of octets for Radio Quality Assistance Information Fields | | | | | | | | |
| Radio Quality Assistance Information | | | | | | | | |
| UL Delay DU Result | | | | | | | | 0 or 4 |
| DL Delay DU Result | | | | | | | | 0 or 4 |

FIG. 6

SECONDARY CELL GROUP ACTIVATION/DEACTIVATION IN SPLIT NODE ARCHITECTURE

TECHNICAL FIELD

The present disclosure relates generally to wireless communication networks and more specifically to techniques that reduced the energy consumed by a user equipment (UE) when connected to multiple cell groups in a wireless network, particularly cell groups provided by network nodes that use a split or distributed architecture.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates an exemplary high-level view of the 5G network architecture, consisting of a Next Generation RAN (NG-RAN) 199 and a 5G Core (5GC) 198. NG-RAN 199 can include a set of gNodeB's (gNBs) connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150. With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501.

The NG RAN logical nodes shown in FIG. 1 include a central (or centralized) unit (CU or gNB-CU) and one or more distributed (or decentralized) units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. Each DU is a logical node that hosts lower-layer protocols and can include, depending on the functional split, various subsets of the gNB functions. A gNB-CU connects to gNB-DUs over respective F1 logical interfaces, such as interfaces 122 and 132 shown in FIG. 1. The gNB-CU and connected gNB-DUs are only visible to other gNBs and the 5GC as a gNB. In other words, the F1 interface is not visible beyond gNB-CU.

Each of the CUs and DUs can include various circuitry needed to perform their respective functions, including processing circuitry, communication interface and/or transceiver circuitry (e.g., for CU/DU communication, CU/CU communication, and/or communication with UEs), power supply circuitry, etc. Moreover, the terms "central unit" and "centralized unit" are used interchangeably herein, as are the terms "distributed unit" and "decentralized unit."

FIG. 2 shows a high-level view of an exemplary 5G network architecture, including an NG-RAN 299 and a 5GC 298. As shown in the figure, NG-RAN 299 can include gNBs 210 (e.g., 210a,b) and ng-eNBs 220 (e.g., 220a,b) that are interconnected with each other via respective Xn interfaces. The gNBs and ng-eNBs are also connected via the NG interfaces to 5GC 298, more specifically to the AMF (Access and Mobility Management Function) 230 (e.g., AMFs 230a, b) via respective NG-C interfaces and to the UPF (User Plane Function) 240 (e.g., UPFs 240a,b) via respective NG-U interfaces. Moreover, the AMFs 230a,b can communicate with one or more policy control functions (PCFs, e.g., PCFs 250a,b) and network exposure functions (NEFs, e.g., NEFs 260a,b).

Each of the gNBs 210 can support the NR radio interface including frequency division duplexing (FDD), time division duplexing (TDD), or a combination thereof. Each of ng-eNBs 220 can support the fourth-generation (4G) Long-Term Evolution (LTE) radio interface. Unlike conventional LTE eNBs, however, ng-eNBs 220 connect to the 5GC via the NG interface. Each of the gNBs and ng-eNBs can serve a geographic coverage area including one more cells, such as cells 211a-b and 221a-b shown in FIG. 2. Depending on the particular cell in which it is located, a UE 205 can communicate with the gNB or ng-eNB serving that particular cell via the NR or LTE radio interface, respectively. Although FIG. 2 shows gNBs and ng-eNBs separately, it is also possible that a single NG-RAN node provides both types of functionality.

5G/NR technology shares many similarities with 4G/LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, NR DL and UL physical resources are organized into equal-sized 1-ms subframes. A subframe is further divided into multiple slots of equal duration, with each slot including multiple OFDM-based symbols. In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE.

The radio resource control (RRC) layer in the NR protocol stack controls communications between UE and gNB at the radio interface as well as the mobility of a UE between cells in the NG-RAN. RRC also broadcasts system information (SI) and performs establishment, configuration, maintenance, and release of radio bearers (e.g., SRBs and DRBs) used by UEs. Additionally, RRC controls addition, modification, and release of carrier aggregation (CA) and dual-connectivity (DC) configurations for UEs, as well as various security functions such as key management.

After a. UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE. UE receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the LE is camping. However, NR_RRC includes an RRC_INACTIVE state in which a UE is known (e.g., via UE context) by the serving gNB. RRC_INACTIVE has some properties similar to a "suspended" condition used in LTE.

Time-frequency resources can be configured much more flexibly for an NR cell than for an LTE cell. One aspect of this flexibility is the use of bandwidth parts (BWPs). While most gNBs can utilize wider bandwidths available in 5G, UE capabilities may vary. Each NR BWP has its own SCS (also referred to as "numerology") and signal characteristic, enabling more efficient use of the spectrum and more efficient UE energy consumption. An NR UE can be configured with up to four BWPs in the DL for any single carrier, with one DL BWP being active at a given time. A UE can be configured with up to four BWPs in the UL for a single carrier, with one UL BWP being active at a given time.

NR also supports the feature of carrier aggregation (CA), which was introduced in LTE Rel-10. In CA, the network can configure a "wideband" carrier for the UE based on a number of "component carriers". In the context of CA, the terms "component carrier" (or CC, for short) and "cell" are often used interchangeably. A primary serving cell (PCell) is defined as the "main" cell serving the wireless device such that both data and control signaling can be transmitted over the PCell, while one or more supplementary or secondary serving cells (SCells) are typically used for transmitting data only. For example, the SCell(s) provide(s) extra bandwidth to enable greater data throughput. A CA-capable UE can be assigned a PCell (or CC) that is always activated, and one or more SCells (or CCs) that can be activated or deactivated dynamically.

The number of aggregated CCs and the bandwidth of individual CCs can be different for UL and DL. A "symmetric configuration" refers to the case where the number of CCs in UL and DL is the same, whereas an "asymmetric configuration" refers to the case that the number of CCs is different. Furthermore, the number of CCs configured within a wideband carrier may be different from the number of CCs seen by a UE. For example, a UE can support more DL CCs than UL CCs, even though the wideband carrier is configured with the same number of UL CCs and DL CCs. Additionally, CA can be configured as inter-band, intra-band contiguous, or intra-band non-contiguous. Intra-band means that the aggregated CCs reside in the same frequency band, and are either contiguous (e.g., adjacent) or non-contiguous (e.g., separated). In contrast, inter-band CCs are located in different frequency bands.

NR also supports dual connectivity (DC), which was introduced in LTE Rel-12. In DC, a UE in RRC_CONNECTED state consumes radio resources provided by at least two different network nodes (or points) connected to one another with a non-ideal backhaul. In LTE, these two network nodes are referred to as "Master eNB" (MeNB) and "Secondary eNB" (SeNB), but they can be referred to more generally as master node (MN) and secondary node (SN)

In DC, a UE is configured with a Master Cell Group (MCG) associated with the MN and a Secondary Cell Group (SCG) associated with the SN. Each of the CGs is a group of serving cells that includes one MAC entity, a set of logical channels with associated RLC entities, a PCell, and optionally one or more SCells. The term "Special Cell" (or "SpCell" for short) refers to the PCell of the MCG or the primary cell of the SCG (PSCell) depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

Several DC (or more generally, multi-connectivity) scenarios have been considered for NR. These include NR-DC in which both the MN and SN (also referred to as "MgNB" and "SgNB") employ the NR interface to communicate with the UE. In addition, various multi-RAT DC (MR-DC) scenarios have been considered, whereby a compatible UE can be configured to utilize resources provided by two different nodes, one providing E-UTRA/LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC). As an example, UE 205 in FIG. 2 can be configured for DC with gNB 210*a* and ng-eNB 220*a*, with one being the MN and the other being the SN.

In order to improve network energy efficiency and battery life for UEs in MR-DC, 3GPP Rel-17 includes a work item for efficient SCG/SCell activation/deactivation. This can be especially important for MR-DC configurations with NR SCG since it has been found that, in some cases, NR UE energy consumption is three-to-four times higher than in LTE.

SUMMARY

However, conventional SCell activation/deactivation techniques can cause various problems, issues, and/or difficulties when used in the split CU-DU architecture in FIG. 1.

Embodiments of the present disclosure provide specific improvements to communication between UEs and network nodes in a wireless network, such as facilitating solutions to exemplary problems summarized above and described in more detail below.

Embodiments include methods (e.g., procedures) for a first node, of a wireless network, that is configured for DC with a UE together with a second node of the wireless network. One of the first and second nodes provides an SCG for the UE. These exemplary methods can be performed by a network node (e.g., base station, eNB, gNB, ng-eNB, etc., or component thereof) having an architecture that is split or distributed into multiple units. In some embodiments and/or variants, operations are performed only by the first unit of the first node. In other embodiments and/or variants, operations are performed by both the first unit of the first node and a second unit of the first node.

These exemplary methods can include a first unit of the first node receiving an indication of change in activation status of the SCG for the UE. These exemplary methods can also include the first unit of the first node sending the indication of change in activation status to one of the following: a second unit of the first node, or a first unit of the second node.

In some embodiments, the indication can be sent via a control plane (CP) interface or via a user plane (UP) interface.

In some embodiments, the first node provides the UE's SCG, i.e., the first node is the SN. In some of these embodiments, the first unit is a CU, the second unit is a DU, and the indication is sent by the first unit of the first node (i.e., SN-CU) to the second unit of the first node (i.e., SN-DU). In some variants, the indication can be received from a first unit of the second node (i.e., from MN-CU), which provides the MCG for the UE. In some variants, these exemplary methods can also include the second unit of the first node (i.e., SN-DU) activating or deactivating resources of the SCG for the UE in accordance with the indicated change in activation status (e.g., received from SN-CU).

In other of these embodiments, the first unit is a DU, the second unit is a CU, and the indication is sent by the first unit of the first node (i.e., SN-DU) to the second unit of the first node (i.e., SN-CU). In some variants, these exemplary methods can also include the first unit of the first node (i.e., SN-DU) activating or deactivating resources of the SCG for the UE in accordance with the indicated change in activation status (e.g., received from SN-CU). In some variants, these exemplary methods can also include the second unit of the first node (i.e., SN-CU) forwarding the indication received from the first unit of the first node (i.e., SN-DU) to the second unit of the second node (i.e., MN-CU).

In other embodiments, the first node provides the UE's MCG, i.e., the first node is the MN. In some of these embodiments, the first unit is a CU, the second unit is a DU, the indication is received from the first unit of the second node (i.e., SN-CU), and the indication sent by the first unit of the first node (i.e., MN-CU) to the second unit of the first node (i.e., MN-DU).

In other of these embodiments, the first unit is a DU, the second unit is a CU, the indication is received from the UE via the MCG provided by the first node, and the indication is sent by the first unit of the first node (i.e., MN-DU) to the second unit of the first node (i.e., MN-CU). In some variants, these exemplary methods can also include the second unit of the first node (i.e., MN-CU) forwarding the indication received from the first unit of the first node (i.e., MN-DU) to the second unit of the second node (i.e., SN-CU).

Other embodiments include methods (e.g., procedures) for a CU of a first node, of a wireless network, that is configured for DC with a UE together with a second node of the wireless network. One of the first and second nodes provides an SCG for the UE. These exemplary methods can be performed by a CU of a network node (e.g., base station, eNB, gNB, ng-eNB, etc.) having an architecture that is split or distributed into multiple units.

These exemplary methods can include initiating a change in activation status of the SCG for the UE, e.g., from activated to deactivated or vice versa. These exemplary methods can also include sending an indication of the change in activation status to at least one of the following: a DU of the first node, a CU of the second node, and the UE.

In some embodiments, the indication can be sent by the CU via respective control plane (CP) interfaces or via respective user plane (UP) interfaces.

In some embodiments, the first node provides the UE's SCG, i.e., the first node is the SN. In such embodiments, these exemplary methods can also include controlling the DU of the first node to activate or deactivate resources of the SCG of the UE in accordance with the indicated change in activation status. In other embodiments, the second node provides the UE's SCG, i.e., the first node is the MN.

In various embodiments, the indication can be sent to the CU of the second node (e.g., MN or SN) and to the DU of the first node (e.g., SN or MN). In some variants, the indication can also be sent to the UE. For example, the CU can send the indication to the UE as an RRC message, or as a MAC CE via the DU of the first node. In some variants, the first node provides the UE's SCG and the indication can be sent to the UE via the SCG. In other variants, the second node provides the UE's SCG and the indication can be sent to the UE via an MCG provided by the first node.

Other embodiments include network nodes (e.g., base stations, eNBs, gNBs, ng-eNBs, etc., or components thereof) and units (e.g., CU, DU) of such network nodes that are configured to perform operations corresponding to any of the exemplary methods described herein. Other embodiments include non-transitory, computer-readable media storing program instructions that, when executed by processing circuitry, configure such network nodes or units to perform operations corresponding to any of the exemplary methods described herein.

These and other embodiments described herein provide flexible and efficient techniques that enable and/or facilitate support for SCG (de)activation in NG-RAN nodes based on the split CU-DU architecture. For example, an SCG (de) activation indication can be signaled from CU to DU and vice versa, and/or from MN CU to SN CU and vice versa. This can facilitate faster SCG (de)activation in the split CU-DU architecture, which can reduce energy consumption of UEs operating in DC (e.g., MR-DC).

These and other objects, features, and advantages of embodiments of the present disclosure will become apparent upon reading the following Detailed Description in view of the Drawings briefly described below.

BRIEF DESCRIPTION OF THE DRAWINGS

FIGS. 4-5 are network diagrams that illustrates network-triggered fast SCG (de)activation with MCG/SCG coordination over control plane (CP) and user plane (UP), respectively, according to various embodiments of the present disclosure.

FIG. 6 shows the structure of an exemplary ASSISTANCE INFORMATION DATA frame, according to various embodiments of the present disclosure.

DETAILED DESCRIPTION

Figure 1:
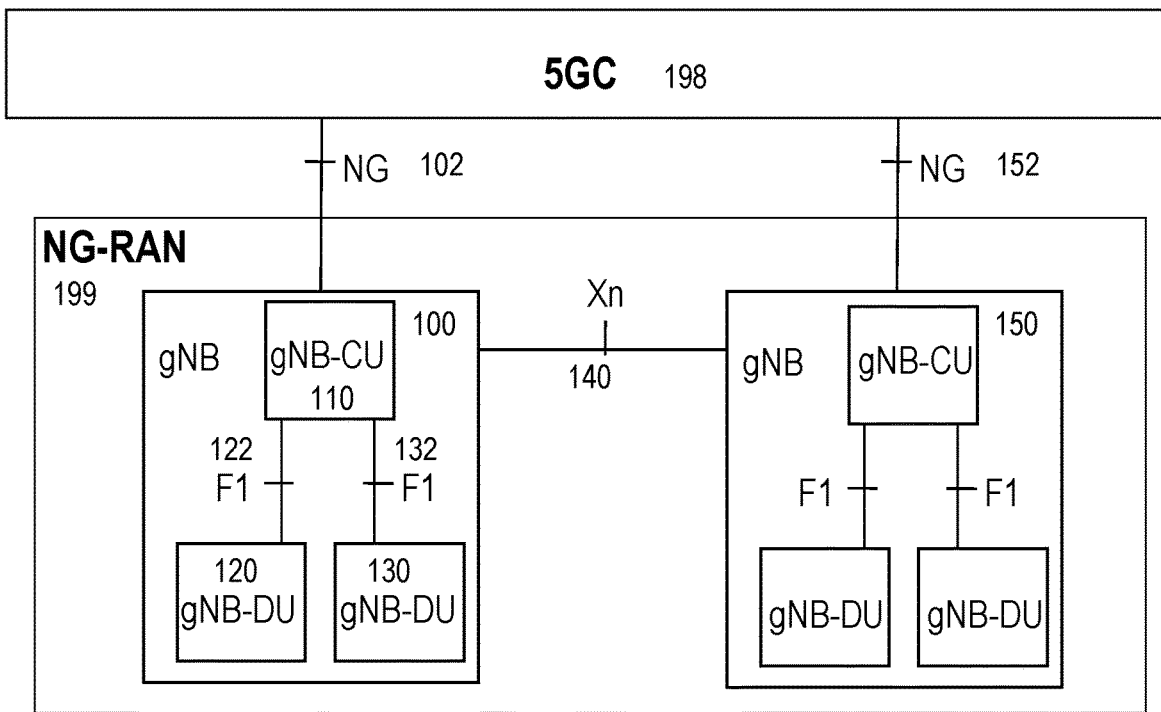
FIGS. 1-2 illustrate two high-level views of an exemplary 5G/NR network architecture.
Figure 2:
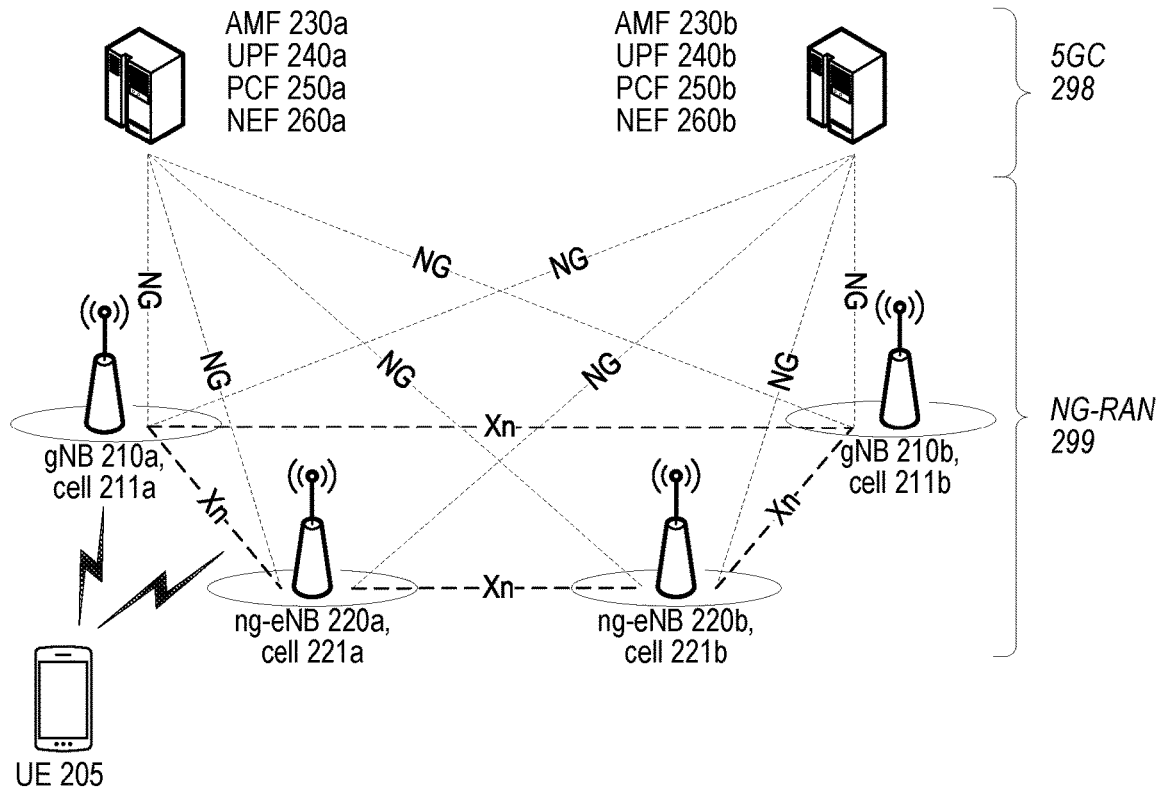

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a radio access node or a wireless device."

Node: As used herein, a "node" can be a network node or a wireless device.

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, SCG/SCell deactivation can be used to reduce UE energy consumption, particular for MR-DC configurations with NR SCG. However, conventional SCell activation/deactivation techniques can cause various problems, issues, and/or difficulties when used in the split CU-DU architecture for gNBs. This is discussed in more detail below.

3GPP TR 38.804 describes various exemplary dual-connectivity (DC) scenarios or configurations in which the MN and SN can apply either NR, LTE, or both. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR, and both are connected to EPC.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR.

MR-DC (multi-RAT DC): a generalization of the Intra-E-UTRA Dual Connectivity (DC) described in TS 36.300, where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC, NE-DC, and NGEN-DC are different example cases of MR-DC.

3GPP Rel-17 includes a work item for efficient SCG/SCell activation/deactivation for UEs in MR-DC. This can be especially important for MR-DC configurations with NR SCG since it has been found that, in some cases, NR UE energy consumption is three-to-four times higher than in LTE. 3GPP previously specified the concepts of dormant LTE SCell and dormancy-like behavior of an NR SCell. In LTE, when an SCell is in dormant state, the UE does not need to monitor the corresponding physical downlink control channel (PDCCH) and physical downlink shared channel (PDSCH) and cannot transmit in the corresponding UL. This behavior is similar to behavior in a deactivated state, except that the UE is also required to perform and report CQI measurements in dormant state. A PUCCH SCell (SCell configured with PUCCH) cannot be in dormant state.

In NR, dormancy-like behavior for SCells is based on the concept of dormant bandwidth parts (BWP). One of the UE's dedicated BWPs configured via RRC signaling can be configured as dormant for an SCell. If the active BWP of the activated SCell is a dormant BWP, the UE stops monitoring PDCCH on the SCell but continues performing channel state information (CSI) measurements, AGC, and beam management (if configured to do so). Downlink control information (DCI) on PDCCH is used to control entering/leaving the dormant BWP for SCell(s) or SCG(s), and is sent to the SpCell of the cell group that includes the dormant SCell (i.e., to PCell if SCell belongs to MCG, to PSCell if SCell belongs to SCG). The SpCell (i.e., PCell or PSCell) and PUCCH SCell cannot be configured with a dormant BWP.

Figure 3:
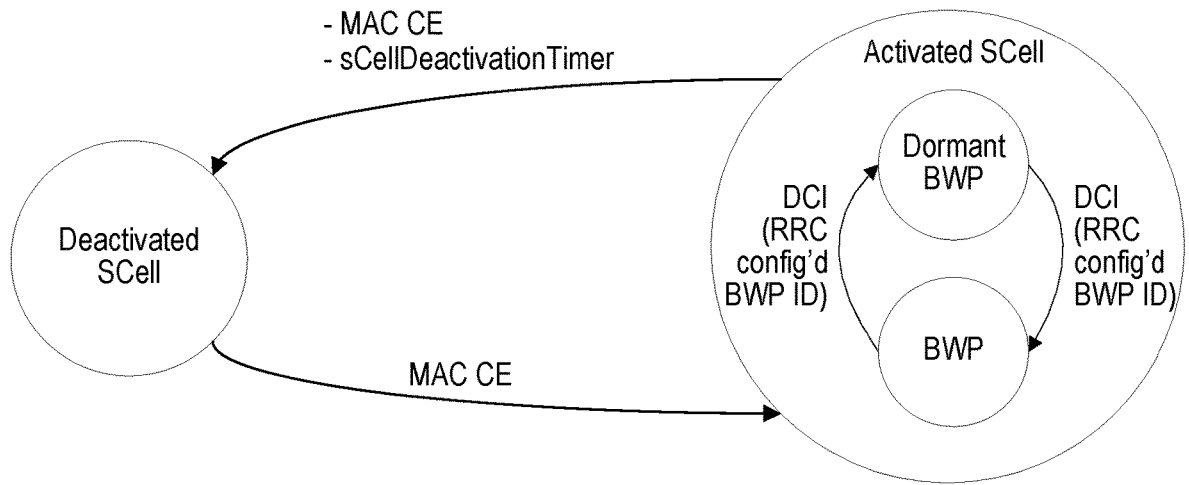
FIG. 3 is an exemplary state transition diagram for NR secondary cells (SCells).

FIG. 3 is an exemplary state transition diagram for NR SCells. At a high level, a UE's SCell can transition between deactivated and activated states based on explicit commands from the network (e.g., MAC CEs) or expiration of a deactivation timer. Within the activated state, a particular BWP can transition between active and dormant conditions based on DCI received from the network.

However, if the UE is configured with MR-DC, it cannot fully benefit from the energy reductions of dormant state or dormancy-like behavior since the PSCell cannot be configured to be dormant. Instead, an existing solution could be releasing (for power savings) and adding (when traffic demands requires) the SCG on an as-needed basis. Traffic is likely to be bursty, however, so adding and releasing the SCG as needed can involve a significant amount of RRC signaling and inter-node messaging between the MN and the SN. This can experience considerable delay.

In the context of 3GPP Rel-16, there were some discussions about placing the PSCell in dormancy, also referred to as SCG Suspension. Some agreed principles of this solution include:

The UE supports network-controlled suspension of the SCG in RRC_CONNECTED.

UE behavior for a suspended SCG is for further study (FFS)

The UE supports at most one SCG configuration, suspended or not suspended, in Rel16.

In RRC_CONNECTED upon addition of the SCG, the SCG can be either suspended or not suspended by configuration.

More detailed solutions were proposed for Rel-16, but these have various problems. For example, one solution proposed that a gNB can indicate for a UE to suspend SCG transmissions when no data traffic is expected to be sent in SCG, so that UE keeps the SCG configuration but does not use it for power saving purposes. Signaling to suspend SCG could be based on DCI/MAC-CE/RRC, but no details were discussed above the particular configuration from the gNB to the UE. Even so, this solution for SCells may not be applicable to PSCells, which may be associated with a different network node (e.g., a gNB operating as SN).

No specific SCG energy reduction techniques have been discussed for 3GPP Rel-17. However, it is expected that such techniques will involve one or more of the following:

The UE starting to operate the PSCell in dormancy, e.g., switching the PSCell to a dormant BWP). The network considers the PSCell in dormancy and at least stops transmitting PDCCH for that UE in the PSCell.

The UE deactivating the PSCell, similar to SCell deactivation. The network considers the PSCell as deactivated and at least stops transmitting PDCCH for that UE in the PSCell.

The UE operating the PSCell in long DRX; SCG DRX can be switched off from the MN (e.g., via MCG MAC CE or DCI) when the need arises, such as DL data arrival for SN-terminated SCG bearers.

The UE suspending its operation with the SCG (e.g., suspending bearers associated with SCG, including MN- and SN-terminated bearers) but storing the SCG configuration ("stored SCG). On the network side, the SN can store the SCG like the UE, or the SN can release the UE's SCG context and re-generate it upon resume. The latter option requires support from the MN, which stores SCG context for UEs whose SCG is suspended.

Although these techniques are focused on SCG, similar approaches can be used on the MCG. For example, the MCG may be suspended or in long DRX, while data communication is happening only via the SCG.

None of the SCG energy reduction techniques have been considered and/or designed based on the split CU-DU architecture for gNBs. Since this split architecture is an important aspect of NG-RAN, there is a need to update the existing procedures and interfaces in the split architecture to support SCG activation/deactivation.

Accordingly, embodiments of the present disclosure provide flexible and efficient techniques to support of SCG (de)activation between CUs and DUs. For example, an SCG (de)activation indication can be signaled from CU to DU, DU to CU, or CU to CU. Furthermore, SCG (de)activation can be accepted or rejected by the CU or the DU. In the following, the term "(de)activation" means "activation or deactivation" unless specifically noted to the contrary or otherwise clear from a particular context.

Figure 4:
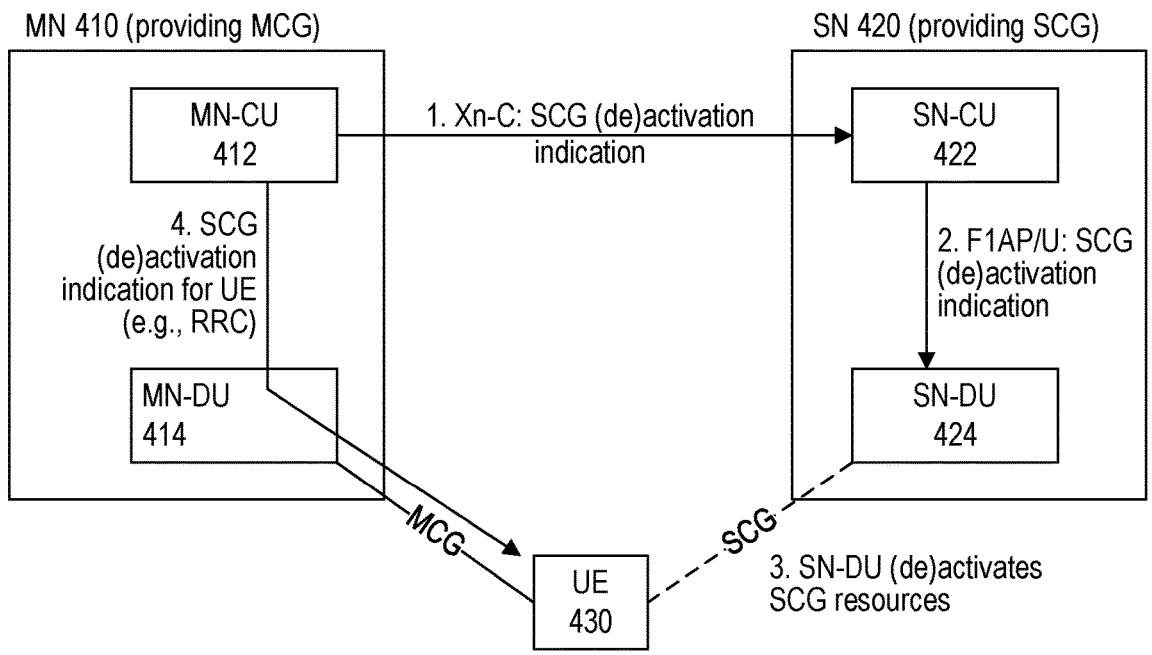

Some embodiments involve network-triggered (by either MN or SN) fast SCG (de)activation with MCG/SCG coordination over control plane (CP). FIG. 4 is a high-level diagram of a UE arranged in DC with an MN and an SN, which illustrates these embodiments. In particular, the MN is arranged as an MN-CU and an MN-DU, which provides the resources for the UE's MCG. Similarly, the SN is arranged as an SN-CU and an SN-DU, which provides the resources for the UE's SCG. Although the operations shown in FIG. 4 have numerical labels, these are intended to facilitate explanation rather than define an operational order, unless specifically noted to the contrary or otherwise clear from a particular context.

In operation 1, the MN-CU sends the SN-CU an SCG (de)activation indication for a change in state of the UE's SCG, i.e., from activated to deactivated or vice versa. This indication can be sent as part of an Xn-AP procedure (e.g., addition/modification) over the Xn-C interface, which is the CP interface between gNBs. For example, the MN-CU can send an S-NG-RAN ADDITION REQUEST or S-NG-RAN NODE MODIFICATION REQUEST message that includes the SCG (de)activation indication. In an alternate embodiment, the MN-CU can send the SN-CU a one-way direct command via Xn-C.

In operation 2, the SN-CU can forward the SCG (de) activation indication received in operation 1 to the SN-DU. For example, the SN-CU can send a UE CONTEXT SETUP REQUEST or a UE CONTEXT MODIFICATION REQUEST message with the SCG (de)activation indication. These messages are part of the F1AP interface between CUs and DUs. Table 1 below shows an exemplary UE CONTEXT SETUP REQUEST message (with certain unrelated items omitted for brevity) that includes an SCG Activation Indication field with enumerated values of "activation" and "deactivation", according to these embodiments. Alternately, the SN-CU can forward the indication in an appropriate message over the F1-U interface with the SN-DU.

exemplary ASSISTANCE INFORMATION DATA frame that includes a one-bit SCG Activation Indication field that can take on values of "0 and "1" corresponding to "deactivation" and "activation", respectively.

In an alternate embodiment, the SN-CU can send the MN-CU an SCG (de)activation indication via Xn-U, in the same manner as described. This can be considered an SN-initiated SCG (de)activation.

In operation 2, the SN-CU can forward the SCG (de) activation indication received in operation 1 to the SN-DU. For example, the SN-CU can send a UE CONTEXT SETUP REQUEST or a UE CONTEXT MODIFICATION REQUEST message with the SCG (de)activation indication, such as illustrated in Table 1 above. Alternately, the SN-CU can forward the indication in an appropriate message over the F1-U interface with the SN-DU. In operation 3, based on the received indication, the SN-DU (de)activates the UE's

TABLE 1

| IE/Group Name | Presence | IE type/ref. | Semantics description |
| --- | --- | --- | --- |
| Message Type | M | 9.3.1.1 | |
| gNB-CU UE F1AP ID | M | 9.3.1.4 | |
| gNB-DU UE F1AP ID | O | 9.3.1.5 | |
| SpCell ID | M | NR CGI 9.3.1.12 | Special Cell as defined in TS 38.321 [16]. For handover case, this IE is considered as target cell. |
| ServCellIndex | M | INTEGER (0 . . . 31, . . .) | |
| SpCell UL Configured | O | Cell UL Configured 9.3.1.33 | |
| CU to DU RRC Information | M | 9.3.1.25 | |
| | | <omitted items> | |
| Management Based MDT PLMN List | O | MDT PLMN List 9.3.1.151 | |
| Serving NID | O | 9.3.1.155 | |
| SCG Activation Indication | O | ENUMERATED (activation, deactivation, . . .) | |

In operation 3, based on the received indication, the SN-DU (de)activates the UE's SCG resources. In operation 4, the MN-CU sends an RRC message to the UE (via the MN-DU) that includes the SCG (de)activation indication. In a variant, if the SCG (de)activation indication indicates SCG activation, the SN can communicate with the UE via the SCG after activating the SCG resources in operation 3.

Other embodiments involve network-triggered (by either MN or SN) fast SCG (de)activation with MCG/SCG coordination over user plane (UP). FIG. 5 is a high-level diagram of a UE arranged in DC with an MN and an SN, which illustrates these embodiments. In particular, the MN and SN are arranged in the same manner as in FIG. 4. Although the operations shown in FIG. 5 have numerical labels, these are intended to facilitate explanation rather than define an operational order, unless specifically noted to the contrary or otherwise clear from a particular context.

In operation 1, the MN-CU sends the SN-CU an SCG (de)activation indication for a change in state of the UE's SCG, i.e., from activated to deactivated or vice versa. This can be considered an MN-initiated SCG (de)activation. This indication can be sent over the Xn-U interface, which is the UP interface between gNBs. For example, the MN-CU can send an Xn-U control frame such as ASSISTANCE INFORMATION DATA defined in 3GPP TS 38.425. FIG. 6 an SCG resources. In operation 4, the MN-CU can send the SCG (de)activation indication to the MN-DU.

For example, the MN-CU can send a UE CONTEXT SETUP REQUEST or a UE CONTEXT MODIFICATION REQUEST message with the SCG (de)activation indication, such as illustrated in Table 1 above. Alternately, the MN-CU can forward the indication in an appropriate message over the F1-U interface with the MN-DU. Operation 4 can be responsive to either the MN-CU initiating the SCG (de) activation or a message received from the SN-CU in operation 1.

In operation 5, the MN-DU forwards the SCG (de) activation indication to the UE, e.g., via a medium access control (MAC) control element (CE). In a variant, if the SCG (de)activation indication indicates SCG activation, the SN can communicate with the UE via the SCG after activating the SCG resources in operation 3.

Figure 7:
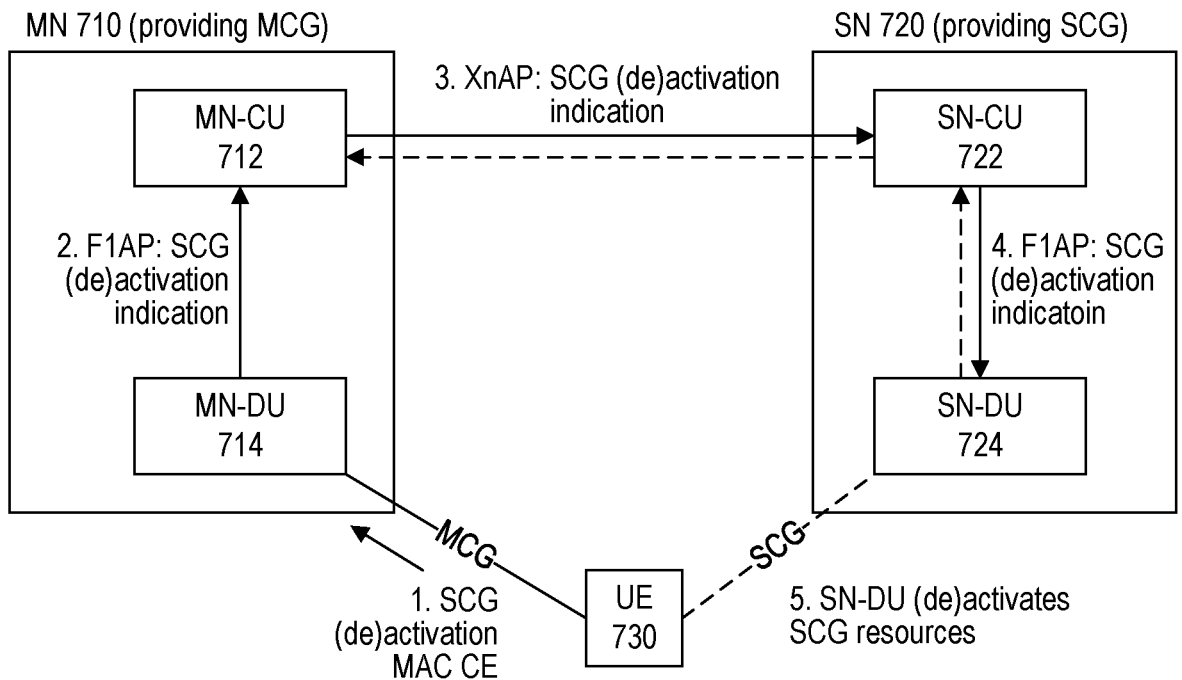
FIGS. 7-8 are network diagrams that illustrates UE-initiated fast SCG (de)activation with MCG/SCG coordination over CP and UP, respectively, according to various embodiments of the present disclosure.

Other embodiments involve UE-triggered (to either MN or SN) fast SCG (de)activation with MCG/SCG coordination over CP. FIG. 7 is a high-level diagram of a UE arranged in DC with an MN and an SN, which illustrates these embodiments. In particular, the MN and SN are arranged in the same manner as in FIGS. 4-5. Although the operations shown in FIG. 7 have numerical labels, these are intended to facilitate explanation rather than define an operational order, unless specifically noted to the contrary or otherwise clear from a particular context.

In operation 1, the UE sends the MN-DU a MAC CE that includes the SCG (de)activation indication for a change in state of the UE's SCG, i.e., from activated to deactivated or vice versa. In operation 2, the MN-DU can forward the SCG (de)activation indication received in operation 1 to the MN-CU. For example, the MN-DU can send a UE CONTEXT SETUP REQUEST or a UE CONTEXT MODIFICATION REQUEST message with the SCG (de)activation indication, such as illustrated in Table 1 above. Alternately, the MN-DU can forward the indication in an appropriate message over the F1-U interface with the MN-CU.

In operation 3, the MN-CU sends the SN-CU the SCG (de)activation indication as part of an Xn-AP procedure (e.g., addition/modification) over the Xn-C interface, which is the CP interface between gNBs. For example, the MN-CU can send an S-NG-RAN ADDITION REQUEST or S-NG-RAN NODE MODIFICATION REQUEST message that includes the SCG (de)activation indication.

In operation 4, the SN-CU can forward the SCG (de)activation indication received in operation 3 to the SN-DU. For example, the SN-CU can send a UE CONTEXT SETUP REQUEST or a UE CONTEXT MODIFICATION REQUEST message with the SCG (de)activation indication, such as illustrated in Table 1 above. Alternately, the SN-CU can forward the indication in an appropriate message over the F1-U interface with the SN-DU. In operation 5, based on the received indication, the SN-DU (de)activates the UE's SCG resources. In a variant, if the SCG (de)activation indication indicates SCG activation, the SN can communicate with the UE via the SCG after activating the SCG resources in operation 5.

As an alternative, in operation 1 the UE sends the SN-DU a MAC CE that includes the SCG (de)activation indication, indicating that the activated SCG should be deactivated. In this alternative, operations 4 and 3 in FIG. 7 can occur in reverse order and with messages in the opposite direction, as indicated by the dashed lines.

In other alternatives, the UE can initiate the procedure shown in FIG. 7 by sending an RRC message with the SCG (de)activation indication to either the MN-CU or the SN-CU.

Figure 8:
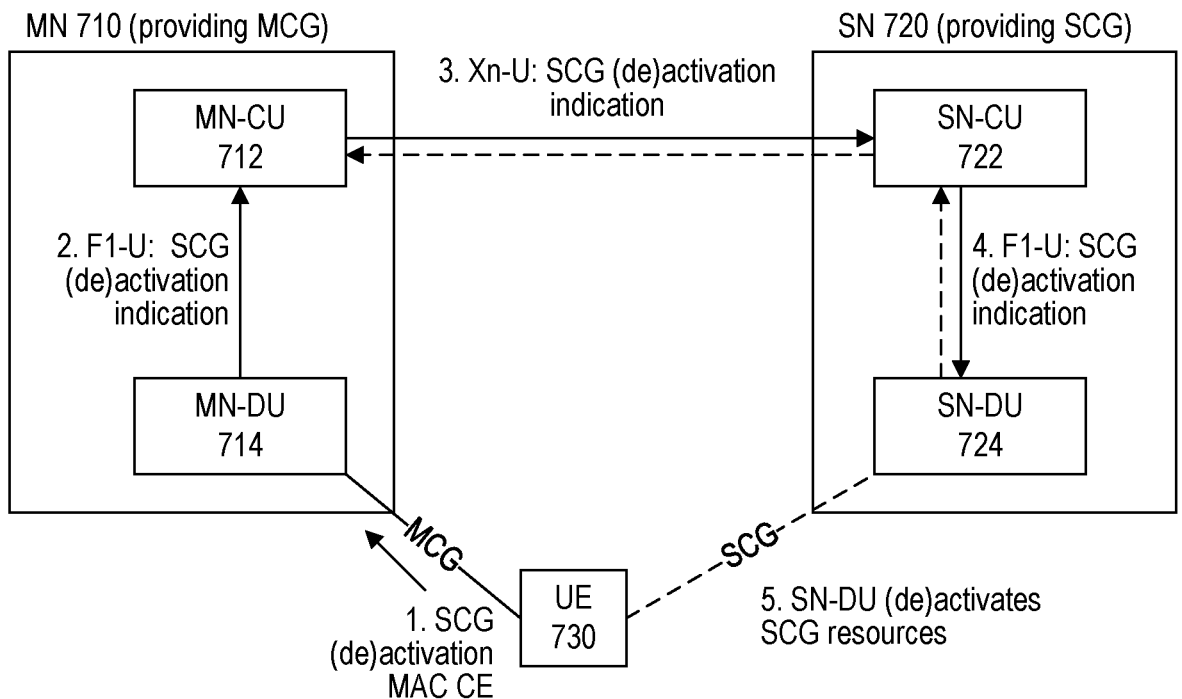

Other embodiments involve UE-triggered (to either MN or SN) fast SCG (de)activation with MCG/SCG coordination over UP. FIG. 8 is a high-level diagram of a UE arranged in DC with an MN and an SN, which illustrates these embodiments. In particular, the MN and SN are arranged in the same manner as in FIGS. 4-5 and 7. Although the operations shown in FIG. 8 have numerical labels, these are intended to facilitate explanation rather than define an operational order, unless specifically noted to the contrary or otherwise clear from a particular context.

In operation 1, the UE sends the MN-DU a MAC CE that includes the SCG (de)activation indication for a change in state of the UE's SCG, i.e., from activated to deactivated or vice versa. In operation 2, the MN-DU can forward the SCG (de)activation indication received in operation 1 to the MN-CU via the F1-U interface. For example, the MN-DU can send an F1-U control frame such as ASSISTANCE INFORMATION DATA shown in FIG. 6 and defined further in 3GPP TS 38.425.

In operation 3, the MN-CU can forward the SCG (de)activation indication received in operation 2 to the SN-CU via the Xn-U interface. For example, the MN-CU can send an Xn-U control frame such as ASSISTANCE INFORMATION DATA shown in FIG. 6 and defined further in 3GPP TS 38.425. In operation 4, the SN-CU can forward the SCG (de)activation indication received in operation 3 to the SN-DU via the F1-U interface. For example, the SN-CU can send an F1-U control frame such as ASSISTANCE INFORMATION DATA shown in FIG. 6 and defined further in 3GPP TS 38.425.

In operation 5, based on the received indication, the SN-DU (de)activates the UE's SCG resources. In a variant, if the SCG (de)activation indication indicates SCG activation, the SN can communicate with the UE via the SCG after activating the SCG resources in operation 5.

As an alternative, in operation 1 the UE sends the SN-DU a MAC CE that includes the SCG (de)activation indication, indicating that the activated SCG should be deactivated. In this alternative, operations 4 and 3 in FIG. 8 can occur in reverse order and with messages in the opposite direction, as indicated by the dashed lines.

In other alternatives, the UE can initiate the procedure shown in FIG. 8 by sending an RRC message with the SCG (de)activation indication to either the MN-CU or the SN-CU. In such case, one of the two F1-U messages shown will not be used.

Figure 9:
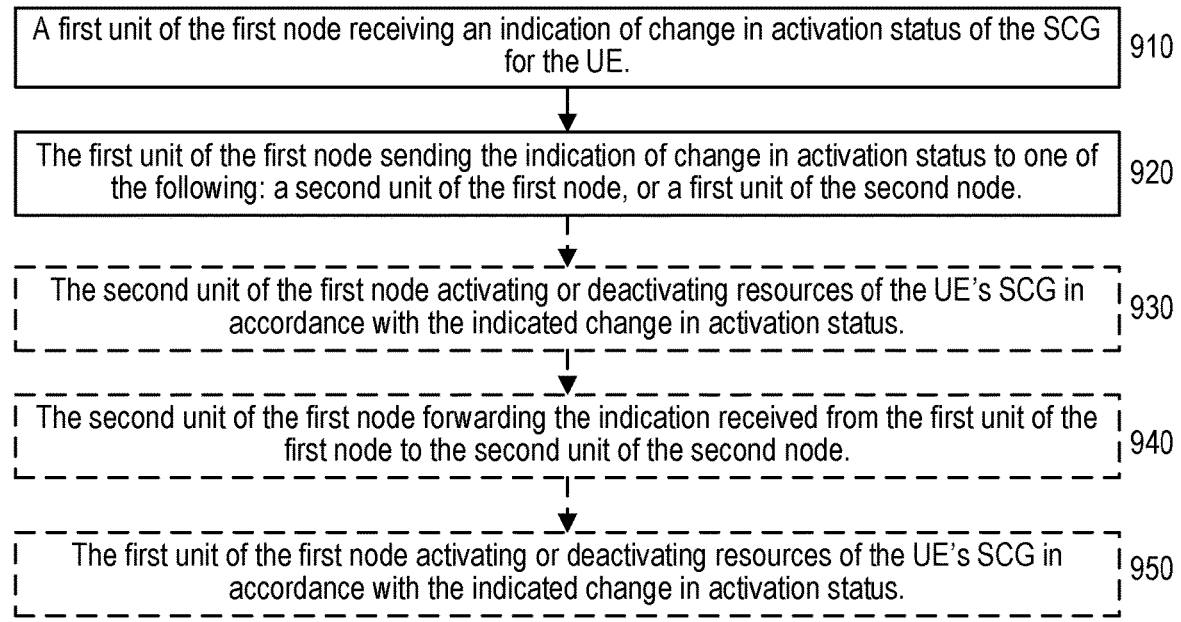
FIG. 9 is a flow diagram of an exemplary method (e.g., procedure) for a first node of a wireless network (e.g., NG-RAN, E-UTRAN), according to various embodiments of the present disclosure.
Figure 10:
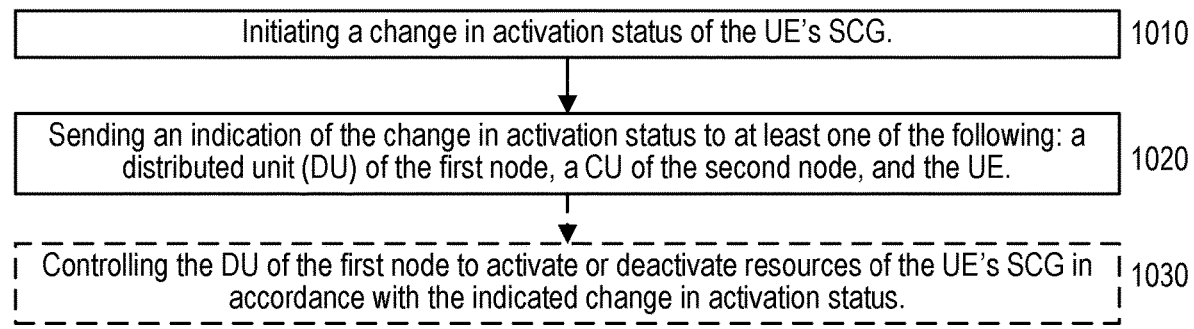
FIG. 10 is a flow diagram of an exemplary method (e.g., procedure) for a CU of a first node of a wireless network (e.g., NG-RAN, E-UTRAN), according to various embodiments of the present disclosure.

Various features of the embodiments described above correspond to various operations illustrated in FIGS. 9-10, which show exemplary methods (e.g., procedures) for a first node and for a CU of a first node, respectively. In other words, various features of the operations described below correspond to various embodiments described above. Furthermore, the exemplary methods shown in FIGS. 9-10 can be used cooperatively to provide various exemplary benefits described herein. Although FIGS. 9-10 show specific blocks in particular orders, the operations of the exemplary methods can be performed in different orders than shown and can be combined and/or divided into blocks having different functionality than shown. Optional blocks or operations are indicated by dashed lines.

In particular, FIG. 9 shows an exemplary method (e.g., procedure) for a first node, of a wireless network, that is configured for DC with a UE together with a second node of the wireless network, according to various embodiments of the present disclosure. One of the first and second nodes provides a secondary cell group (SCG) for the UE.

The exemplary method can be performed by a network node (e.g., base station, eNB, gNB, ng-eNB, etc., or component thereof) having an architecture that is split or distributed into multiple units, such as shown in other figures described herein. In some embodiments and/or variants of the exemplary method, operations are performed only by the first unit of the first node. In other embodiments and/or variants, operations are performed by both the first unit of the first node and a second unit of the first node.

The exemplary method can include the operations of block 910, where a first unit of the first node can receive an indication of change in activation status of the SCG for the UE. The exemplary method can also include the operations of block 920, where the first unit of the first node can send the indication of change in activation status to one of the following: a second unit of the first node, or a first unit of the second node.

In some embodiments, the indication can be sent (e.g., in block 920) via a control plane (CP) interface or via a user plane (UP) interface. For example, CP interfaces can include Xn-AP and F1-AP interfaces, while UP interfaces can include Xn-U and F1-U interfaces, as discussed above.

In some embodiments, the first node provides the UE's SCG, i.e., the first node is the SN. In some of these embodiments, the first unit is a CU, the second unit is a DU, and the indication is sent (e.g., in block 920) by the first unit of the first node (i.e., SN-CU) to the second unit of the first node (i.e., SN-DU). In some variants, the indication can be received from a first unit of the second node (i.e., from MN-CU), which provides the MCG for the UE. In some variants, the exemplary method can also include the operations of block 930, where the second unit of the first node (i.e., SN-DU) can activate or deactivate resources of the SCG for the UE in accordance with the indicated change in activation status (e.g., received from SN-CU).

In other of these embodiments, the first unit is a DU, the second unit is a CU, and the indication is sent (e.g., in block 920) by the first unit of the first node (i.e., SN-DU) to the second unit of the first node (i.e., SN-CU). In some variants, the exemplary method can also include the operations of block 950, where the first unit of the first node (i.e., SN-DU) can activate or deactivate resources of the SCG for the UE in accordance with the indicated change in activation status (e.g., received from SN-CU). In some variants, the exemplary method can also include the operations of block 940, where the second unit of the first node (i.e., SN-CU) can forward the indication received from the first unit of the first node (i.e., SN-DU) to the second unit of the second node (i.e., MN-CU).

In other embodiments, the first node provides the UE's MCG, i.e., the first node is the MN. In some of these embodiments, the first unit is a CU, the second unit is a DU, the indication is received from the first unit of the second node (i.e., SN-CU), and the indication sent by the first unit of the first node (i.e., MN-CU) to the second unit of the first node (i.e., MN-DU).

In other of these embodiments, the first unit is a DU, the second unit is a CU, the indication is received from the UE (e.g., as a MAC CE) via the MCG provided by the first node, and the indication is sent by the first unit of the first node (i.e., MN-DU) to the second unit of the first node (i.e., MN-CU). In some variants, the exemplary method can also include the operations of block 940, where the second unit of the first node (i.e., MN-CU) can forward the indication received from the first unit of the first node (i.e., MN-DU) to the second unit of the second node (i.e., SN-CU).

In addition, FIG. 10 shows an exemplary method (e.g., procedure) for a CU of a first node, of a wireless network, that is configured for DC with a UE together with a second node of the wireless network, according to various embodiments of the present disclosure. One of the first and second nodes provides an SCG for the UE. The exemplary method can be performed by a CU of a network node (e.g., base station, eNB, gNB, ng-eNB, etc.) with an architecture that is split or distributed into multiple units, such shown in other figures described herein.

The exemplary method can include the operations of block 1010, where the CU can initiate a change in activation status of the SCG for the UE, e.g., from activated to deactivated or vice versa. The exemplary method can also include the operations of block 1020, where the CU can send an indication of the change in activation status to at least one of the following: a distributed unit (DU) of the first node, a CU of the second node, and the UE.

In some embodiments, the indication can be sent (e.g., in block 1020) by the CU via respective control plane (CP) interfaces or via respective user plane (UP) interfaces. For example, CP interfaces can include Xn-AP and F1-AP interfaces, while UP interfaces can include Xn-U and F1-U interfaces, as discussed above.

In some embodiments, the first node provides the UE's SCG, i.e., the first node is the SN. In such embodiments, the exemplary method can also include the operations of block 1030, where the CU can control the DU of the first node to activate or deactivate resources of the SCG of the UE in accordance with the indicated change in activation status. In other embodiments, the second node provides the UE's SCG, i.e., the first node is the MN.

In various embodiments, the indication can be sent (e.g., in block 1020) to the CU of the second node (e.g., MN or SN) and to the DU of the first node (e.g., SN or MN). In some variants, the indication can also be sent to the UE. For example, the CU can send the indication to the UE as a radio resource control (RRC) message, or as a MAC CE via the DU of the first node. In some variants, the first node provides the UE's SCG and the indication can be sent to the UE via the SCG. In other variants, the second node provides the UE's SCG and the indication can be sent to the UE via an MCG provided by the first node.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 11:
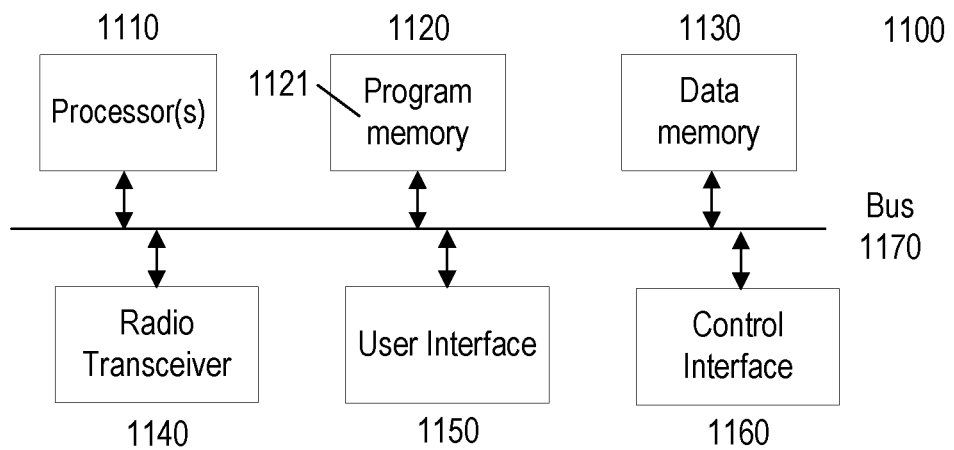
FIG. 11 shows a block diagram of an exemplary wireless device or UE, according to various embodiments of the present disclosure.

FIG. 11 shows a block diagram of an exemplary wireless device or user equipment (UE) 1100 (hereinafter referred to as "UE 1100") according to various embodiments of the present disclosure, including those described above with reference to other figures. For example, UE 1100 can be configured by execution of instructions, stored on a computer-readable medium, to perform operations corresponding to one or more of the exemplary methods described herein.

UE 1100 can include a processor 1110 (also referred to as "processing circuitry") that can be operably connected to a program memory 1120 and/or a data memory 1130 via a bus 1170 that can comprise parallel address and data buses, serial ports, or other methods and/or structures known to those of ordinary skill in the art. Program memory 1120 can store software code, programs, and/or instructions (collectively shown as computer program product 1121 in FIG. 11) that, when executed by processor 1110, can configure and/or facilitate UE 1100 to perform various operations, including operations corresponding to various exemplary methods described herein. As part of or in addition to such operations, execution of such instructions can configure and/or facilitate UE 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1140, user interface 1150, and/or control interface 1160.

As another example, processor 1110 can execute program code stored in program memory 1120 that corresponds to MAC, RLC, PDCP, SDAP, RRC, and NAS layer protocols standardized by 3GPP (e.g., for NR and/or LTE). As a further example, processor 1110 can execute program code stored in program memory 1120 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1110 can execute program code stored in program memory 1120 that, together with radio transceiver 1140, implements device-to-device (D2D) communications with other compatible devices and/or UEs.

Program memory 1120 can also include software code executed by processor 1110 to control the functions of UE 1100, including configuring and controlling various components such as radio transceiver 1140, user interface 1150, and/or control interface 1160. Program memory 1120 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1120 can comprise an external storage arrangement (not shown) remote from UE 1100, from which the instructions can be downloaded into program memory 1120 located within or removably coupled to UE 1100, so as to enable execution of such instructions.

Data memory 1130 can include memory area for processor 1110 to store variables used in protocols, configuration, control, and other functions of UE 1100, including operations corresponding to, or comprising, any of the exemplary methods described herein. Moreover, program memory 1120 and/or data memory 1130 can include non-volatile memory (e.g., flash memory), volatile memory (e.g., static or dynamic RAM), or a combination thereof. Furthermore, data memory 1130 can comprise a memory slot by which removable memory cards in one or more formats (e.g., SD Card, Memory Stick, Compact Flash, etc.) can be inserted and removed.

Persons of ordinary skill will recognize that processor 1110 can include multiple individual processors (including, e.g., multi-core processors), each of which implements a portion of the functionality described above. In such cases, multiple individual processors can be commonly connected to program memory 1120 and data memory 1130 or individually connected to multiple individual program memories and or data memories. More generally, persons of ordinary skill in the art will recognize that various protocols and other functions of UE 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1140 can include radio-frequency transmitter and/or receiver functionality that facilitates the UE 1100 to communicate with other equipment supporting like wireless communication standards and/or protocols. In some exemplary embodiments, the radio transceiver 1140 includes one or more transmitters and one or more receivers that enable UE 1100 to communicate according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures.

In some exemplary embodiments, radio transceiver 1140 includes one or more transmitters and one or more receivers that can facilitate the UE 1100 to communicate with various LTE, LTE-Advanced (LTE-A), and/or NR networks according to standards promulgated by 3GPP. In some exemplary embodiments of the present disclosure, the radio transceiver 1140 includes circuitry, firmware, etc. necessary for the UE 1100 to communicate with various NR, NR-U, LTE, LTE-A, LTE-LAA, UMTS, and/or GSM/EDGE networks, also according to 3GPP standards. In some embodiments, radio transceiver 1140 can include circuitry supporting D2D communications between UE 1100 and other compatible devices.

In some embodiments, radio transceiver 1140 includes circuitry, firmware, etc. necessary for the UE 1100 to communicate with various CDMA2000 networks, according to 3GPP2 standards. In some embodiments, the radio transceiver 1140 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1140 can include a transceiver that is capable of wired communication, such as by using IEEE 802.3 Ethernet technology. The functionality particular to each of these embodiments can be coupled with and/or controlled by other circuitry in the UE 1100, such as the processor 1110 executing program code stored in program memory 1120 in conjunction with, and/or supported by, data memory 1130.

User interface 1150 can take various forms depending on the particular embodiment of UE 1100, or can be absent from UE 1100 entirely. In some embodiments, user interface 1150 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1100 having a touch screen display are capable of receiving user inputs, such as inputs related to exemplary methods described herein or otherwise known to persons of ordinary skill.

In some embodiments, UE 1100 can include an orientation sensor, which can be used in various ways by features and functions of UE 1100. For example, the UE 1100 can use outputs of the orientation sensor to determine when a user has changed the physical orientation of the UE 1100's touch screen display. An indication signal from the orientation sensor can be available to any application program executing on the UE 1100, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1160 of the UE 1100 can take various forms depending on the particular exemplary embodiment of UE 1100 and of the particular interface requirements of other devices that the UE 1100 is intended to communicate with and/or control. For example, the control interface 1160 can comprise an RS-232 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1160 can comprise an IEEE 802.3 Ethernet interface such as described above. In some exemplary embodiments of the present disclosure, the control interface 1160 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1100 can comprise more functionality than is shown in FIG. 11 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1120 to control such additional functionality. For example, directional velocity and/or position estimates output from a GPS receiver can be available to any application program executing on the UE 1100, including any program code corresponding to and/or embodying any exemplary embodiments (e.g., of methods) described herein.

Figure 12:
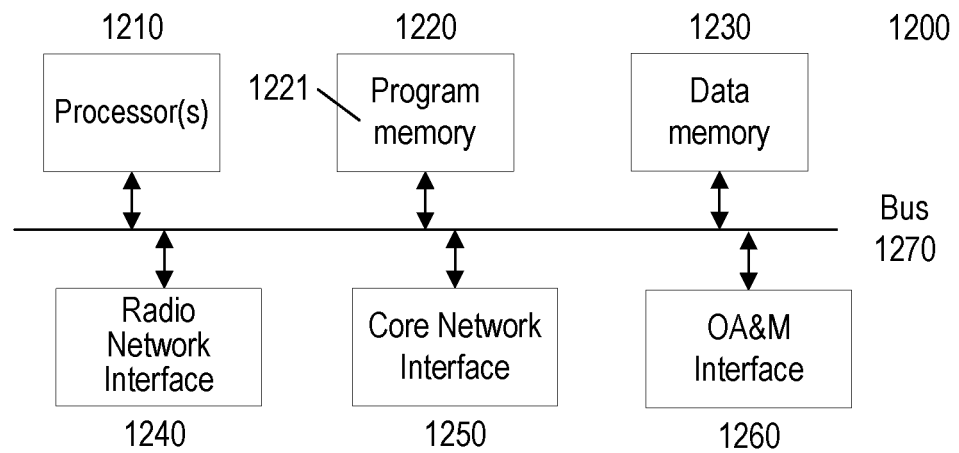
FIG. 12 shows a block diagram of an exemplary network node according to various embodiments of the present disclosure.

FIG. 12 shows a block diagram of an exemplary network node 1200 according to various embodiments of the present disclosure, including those described above with reference to other figures. For example, exemplary network node 1200 can be configured by execution of instructions, stored on a computer-readable medium, to perform operations corresponding to one or more of the exemplary methods described herein. In some exemplary embodiments, network node 1200 can comprise a base station, eNB, gNB, or one or more components thereof. For example, network node 1200 can be configured as a central unit (CU) and one or more distributed units (DUs) according to NR gNB architectures specified by 3GPP. More generally, functionally of network node 1200 can be distributed across various physical devices and/or functional units, modules, etc.

Network node 1200 can include processor 1210 (also referred to as "processing circuitry") that is operably connected to program memory 1220 and data memory 1230 via bus 1270, which can include parallel address and data buses, serial ports, or other methods and/or structures known to those of ordinary skill in the art.

Program memory 1220 can store software code, programs, and/or instructions (collectively shown as computer program product 1221 in FIG. 12) that, when executed by processor 1210, can configure and/or facilitate network node 1200 to perform various operations, including operations corresponding to various exemplary methods described herein. As part of and/or in addition to such operations, program memory 1220 can also include software code executed by processor 1210 that can configure and/or facilitate network node 1200 to communicate with one or more other UEs or network nodes using other protocols or protocol layers, such as one or more of the PHY, MAC, RLC, PDCP, SDAP, RRC, and NAS layer protocols standardized by 3GPP for LTE, LTE-A, and/or NR, or any other higher-layer protocols utilized in conjunction with radio network interface 1240 and/or core network interface 1250. By way of example, core network interface 1250 can comprise the S1 or NG interface and radio network interface 1240 can comprise the Uu interface, as standardized by 3GPP. Program memory 1220 can also comprise software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can include multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some embodiments, interface 1240 can also enable network node 1200 to communicate with compatible satellites of a satellite communication network. In some exemplary embodiments, radio network interface 1240 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1240. According to further exemplary embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the S1 interface standardized by 3GPP. In some embodiments, core network interface 1250 can comprise the NG interface standardized by 3GPP. In some exemplary embodiments, core network interface 1250 can comprise one or more interfaces to one or more AMFs, SMFs, SGWs, MMES, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1200 can include hardware and/or software that configures and/or facilitates network node 1200 to communicate with other network nodes in a RAN, such as with other eNBs, gNBs, ng-eNBs, en-gNBs, CUs, DUs, IAB nodes, etc. Such hardware and/or software can be part of radio network interface 1240 and/or core network interface 1250, or it can be a separate functional unit (not shown). For example, such hardware and/or software can configure and/or facilitate network node 1200 to communicate with other RAN nodes via the UE X2 or Xn interfaces, as standardized by 3GPP.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1240, core network interface 1250, and OA&M interface 1260 may be multiplexed together on a single physical interface, such as the examples listed above.

Figure 13:
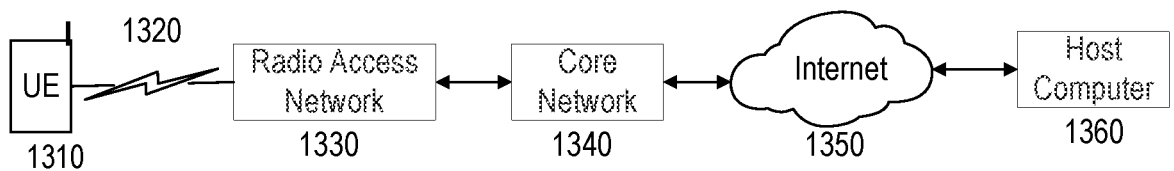
FIG. 13 shows a block diagram of an exemplary network configured to provide over-the-top (OTT) data services between a host computer and a UE, according to various embodiments of the present disclosure.

FIG. 13 is a block diagram of an exemplary communication network configured to provide over-the-top (OTT) data services between a host computer and a user equipment (UE), according to one or more exemplary embodiments of the present disclosure. UE 1310 can communicate with radio access network (RAN) 1330 over radio interface 1320, which can be based on protocols described above including, e.g., LTE, LTE-A, and 5G/NR. For example, UE 1310 can be configured and/or arranged as shown in other figures discussed above.

RAN 1330 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1330 can cooperatively operate using licensed and unlicensed spectrum. In some embodiments, RAN 1330 can include, or be capable of communication with, one or more satellites comprising a satellite access network.

RAN 1330 can further communicate with core network 1340 according to various protocols and interfaces described above. For example, one or more apparatus (e.g., base stations, eNBs, gNBs, etc.) comprising RAN 1330 can communicate to core network 1340 via core network interface 1350 described above. In some exemplary embodiments, RAN 1330 and core network 1340 can be configured and/or arranged as shown in other figures discussed above. For example, eNBs comprising an evolved UTRAN (E-UTRAN) 1330 can communicate with an evolved packet core (EPC) network 1340 via an S1 interface. As another example, gNBs and ng-eNBs comprising an NG-RAN 1330 can communicate with a 5GC network 1330 via an NG interface.

Core network 1340 can further communicate with an external packet data network, illustrated in FIG. 13 as Internet 1350, according to various protocols and interfaces known to persons of ordinary skill in the art. Many other devices and/or networks can also connect to and communicate via Internet 1350, such as exemplary host computer 1360. In some exemplary embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 13 including, e.g., streaming (unidirectional) audio and/or video from host computer to UE, interactive (bidirectional) audio and/or video between host computer and UE, interactive messaging or social communication, interactive virtual or augmented reality, cloud gaming, etc.

The exemplary network shown in FIG. 13 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide flexible and efficient techniques that enable and/or facilitate support for SCG (de)activation in NG-RAN nodes based on the split CU-DU architecture. For example, an SCG (de)activation indication can be signaled from CU to DU and vice versa, and/or from MN CU to SN CU and vice versa. This can facilitate faster SCG (de)activation in the split CU-DU architecture and reduce UE energy consumption related to SCG. When used in NR gNBs (e.g., gNBs comprising RAN 1330), exemplary embodiments described herein can increase the use of data services by allowing the UE to allocate a greater portion of its stored energy for data services (e.g., eMBB) as well as respond more quickly to intermittent use of such data services. Consequently, this increases the benefits and/or value of such data services to end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for a first node, of a wireless network, that is configured for dual connectivity (DC) with a user equipment (UE) together with a second node of the wireless network, wherein one of the first and second nodes provides a secondary cell group (SCG) for the UE, the method comprising:
  receiving, by a first unit of the first node, an indication of change in activation status of the UE's SCG; and
  sending, by the first unit of the first node, the indication of change in activation status to at least one of the following:
    a second unit of the first node, and
    a first unit of the second node.

A2. The method of embodiment A1, wherein the indication is sent by the first unit of the first node via one of the following:
  respective control plane (CP) interfaces; or
  respective user plane (UP) interfaces.

A3. The method of any of embodiments A1-A2, wherein the first node provides the UE's SCG.

A4. The method of embodiment A3, wherein:
  the first unit of the first node is a centralized unit (CU); and
  the indication is sent to a distributed unit (DU) of the first node.

A5. The method of embodiment A3, wherein:
  the first unit of the first node is a distributed unit (DU);
  the indication is sent to a centralized unit (CU) of the first node by the DU; and
  the indication is sent to a CU of the second node by the CU of the first node.

A6. The method of embodiment A5, wherein the indication is received from the UE via the SCG.

A7. The method of any of embodiments A3-A6, further comprising activating or deactivating resources of the UE's SCG in accordance with the indicated change in activation status.

A8. The method of embodiment A1-A2, wherein the second node provides the UE's SCG.

A9. The method of embodiment A8, wherein:
  the first unit of the first node is a centralized unit (CU);
  the indication is received from a CU of the second node; and
  the indication is sent to a distributed unit (DU) of the first node.

A10. The method of embodiment A8, wherein:
  the first unit of the first node is a distributed unit (DU);
  the indication is sent to a centralized unit (CU) of the first node by the DU; and
  the indication is sent to a CU of the second node by the CU of the first node.

A11. The method of embodiment A10, wherein the indication is received from the UE via a master cell group (MCG) provided by the first node.

B1. A method for a centralized unit (CU) of a first node, of a wireless network, that is configured for dual connectivity (DC) with a user equipment (UE) together with a second node of the wireless network, wherein one of the first and second nodes provides a secondary cell group (SCG) for the UE, the method comprising:
  initiating a change in activation status of the UE's SCG; and
  sending an indication of the change in activation status to at least one of the following:
    a distributed unit (DU) of the first node,
    a CU of the second node, and
    the UE.

B2. The method of embodiment B1, wherein the indication is sent via one of the following:
  respective control plane (CP) interfaces; or
  respective user plane (UP) interfaces.

B3. The method of any of embodiments B1-B2, wherein the first node provides the UE's SCG.

B4. The method of embodiment B3, further comprising controlling the DU of the first node to activate or deactivate resources of the UE's SCG in accordance with the indicated change in activation status.

B5. The method of embodiment B1-B2, wherein the second node provides the UE's SCG.

B6. The method of any of embodiments B1-B5, wherein the indication is sent to the CU of the second node and to the DU of the first node.

B7. The method of embodiment B6, wherein the indication is also sent to the UE.

B8. The method of embodiment B7, wherein the indication is sent to the UE as one of the following:
  radio resource control (RRC) message from the CU of the first node; or
  medium access control (MAC) control element (CE) from the DU of the first node.

B9. The method of any of embodiments B7-B8, wherein one of the following applies:
  the first node provides the UE's SCG and the indication is sent to the UE via the SCG; or
  the second node provides the UE's SCG and the indication is sent to the UE via a master cell group (MCG) provided by the first node.

C1. A first node, of a wireless network, that is configured for dual connectivity (DC) with a user equipment (UE) together with a second node of the wireless network, wherein one of the first and second nodes provides a secondary cell group (SCG) for the UE, the first node comprising:
  radio network interface circuitry configured to communicate with the UE and with the second node; and
  processing circuitry operatively coupled to the radio network interface circuitry, whereby the processing circuitry and the radio network interface circuitry are configured to perform operations corresponding to any of the methods of embodiments A1-A11.

C2. A first node, of a wireless network, that is configured for dual connectivity (DC) with a user equipment (UE) together with a second node of the wireless network, wherein one of the first and second nodes provides a secondary cell group (SCG) for the UE, wherein the first node is further arranged to perform operations corresponding to any of the methods of embodiments A1-A11.

C3. A non-transitory, computer-readable medium storing computer-executable instructions that, when executed by processing circuitry of a first node, of a wireless network, that is configured for dual connectivity (DC) with a user equipment (UE) together with a second node of the wireless network, configure the first node to perform operations corresponding to any of the methods of embodiments A1-A11.

C4. A computer program product comprising computer-executable instructions that, when 35 executed by processing circuitry of a first node, of a wireless network, that is configured for dual connectivity (DC) with a user equipment (UE) together with a second node of the wireless network, configure the first node to perform operations corresponding to any of the methods of embodiments A1-A11.

D1. A centralized unit (CU) of a first node, of a wireless network, that is configured for dual connectivity (DC) with a user equipment (UE) together with a second node of the wireless network, wherein one of the first and second nodes provides a secondary cell group (SCG) for the UE, the CU comprising:
  communication interface circuitry configured to communicate with a distributed unit (DU) of the first node, a CU of the second node, and the UE; and
  processing circuitry operatively coupled to the communication interface circuitry, whereby the processing circuitry and the communication interface circuitry are configured to perform operations corresponding to any of the methods of embodiments B1-B9.

D2. A centralized unit (CU) of a first node, of a wireless network, that is configured for dual connectivity (DC) with a user equipment (UE) together with a second node of the wireless network, wherein one of the first and second nodes provides a secondary cell group (SCG) for the UE, wherein the CU is further arranged to perform operations corresponding to any of the methods of embodiments B1-B9.

D3. A non-transitory, computer-readable medium storing computer-executable instructions that, when executed by processing circuitry of a centralized unit (CU) of a first node, of a wireless network, that is configured for dual connectivity (DC) with a user equipment (UE) together with a second node of the wireless network, configure the CU to perform operations corresponding to any of the methods of embodiments B1-B9.

D4. A computer program product comprising computer-executable instructions that, when executed by processing circuitry of a centralized unit (CU) of a first node, of a wireless network, that is configured for dual connectivity (DC) with a user equipment (UE) together with a second node of the wireless network, configure the CU to perform operations corresponding to any of the methods of embodiments B1-B9.

The invention claimed is:

1. A method for a first node, of a wireless network, that is configured for dual connectivity (DC) with a user equipment (UE) together with a second node of the wireless network, wherein each of the first and second nodes includes a first unit and a second unit, wherein the first unit is one of a centralized unit (CU) and a distributed unit (DU), wherein the second unit is the other of the CU and the DU, wherein the method comprises:
  the first unit of the first node receiving an indication of change in activation status of a secondary cell group (SCG) for the UE, wherein:
    one of the first and second nodes provides the SCG, and
    the change in activation status is from SCG activated to SCG deactivated or vice versa; and
  the first unit of the first node sending the indication of change in activation status to one of the following: the second unit of the first node, or the first unit of the second node.

2. The method of claim 1, wherein the first node provides the SCG for the UE.

3. The method of claim 2, wherein:
the first unit is the CU and the second unit is the DU; and
the indication is sent by the first unit of the first node to the second unit of the first node.

4. The method of claim 3, wherein the indication is received from the first unit of the second node, which provides a master cell group (MCG) for the UE.

5. The method of claim 2, further comprising the second unit of the first node activating or deactivating resources of the SCG for the UE in accordance with the indicated change in activation status.

6. The method of claim 2, wherein:
the second unit is the CU and the first unit is the DU;
the indication is received from the UE via the SCG; and
the indication is sent by the first unit of the first node to the second unit of the first node.

7. The method of claim 6, further comprising the first unit of the first node activating or deactivating resources of the SCG for the UE in accordance with the indicated change in activation status.

8. The method of claim 6, further comprising the second unit of the first node forwarding the indication received from the first unit of the first node to the second unit of the second node.

9. The method of claim 1, wherein the second node provides the SCG for the UE.

10. The method of claim 9, wherein:
the first unit is the CU and the second unit is the DU;
the indication is received from the first unit of the second node; and
the indication is sent by the first unit of the first node to the second unit of the first node.

11. The method of claim 9, wherein:
the second unit is the CU and the first unit is the DU;
the indication is received from the UE via a master cell group (MCG) provided by the first node; and
the indication is sent by the first unit of the first node to the second unit of the first node.

12. The method of claim 11, further comprising the second unit of the first node forwarding, to the second unit of the second node, the indication received from the first unit of the first node.

13. A method for a centralized unit (CU) of a first node, of a wireless network, that is configured for dual connectivity (DC) with a user equipment (UE) together with a second node of the wireless network, the method comprising:
initiating a change in activation status of the SCG for the UE, wherein:
one of the first and second nodes provides a secondary cell group (SCG) for the UE, and
the change in activation status is from SCG activated to SCG deactivated or vice versa; and
sending an indication of the change in activation status to at least one of the following:
a distributed unit (DU) of the first node,
a CU of the second node, and
the UE.

14. The method of claim 13, wherein the first node provides the SCG for the UE.

15. The method of claim 14, further comprising controlling the DU of the first node to activate or deactivate resources of the SCG for the UE in accordance with the indicated change in activation status.

16. The method of claim 13, wherein the second node provides the SCG for the UE.

17. The method of claim 13, wherein the indication is sent to the CU of the second node and to the DU of the first node.

18. The method of claim 17, wherein the indication is also sent to the UE as one of the following:
radio resource control (RRC) message; or
medium access control (MAC) control element (CE) via the DU of the first node.

19. The method of claim 18, wherein one of the following applies:
the first node provides the SCG for the UE and the indication is sent to the UE via the SCG; or
the second node provides the SCG for the UE and the indication is sent to the UE via a master cell group (MCG) provided by the first node.

20. A first unit of a first node of a wireless network, the first node being configured for dual connectivity (DC) with a user equipment (UE) together with a second node of the wireless network, wherein each of the first and second nodes includes a first unit and a second unit, wherein the first unit is one of a centralized unit (CU) and a distributed unit (DU), and the second unit is the other of the CU and the DU, wherein the first unit comprises:
radio network interface circuitry configured to communicate with the UE and with at least the second unit of the first node; and
processing circuitry operatively coupled to the radio network interface circuitry, whereby the processing circuitry and the radio network interface circuitry are configured to:
receive an indication of change in activation status of the SCG for the UE, wherein:
one of the first and second nodes provides the SCG, and
the change in activation status is from SCG activated to SCG deactivated or vice versa; and
send the indication of change in activation status to one of the following:
the second unit of the first node, or
the first unit of the second node.

21. A first node of a wireless network, the first node being configured for dual connectivity (DC) with a user equipment (UE) together with a second node of the wireless network, wherein the first node comprises:
the first unit of claim 20; and
processing circuitry and radio network interface circuitry arranged as the second unit of the first node and configured to:
when the second unit of the first node is the DU, activate or deactivate resources of the SCG for the UE in accordance with the indicated change in activation status; and
when the second unit of the first node is the CU, forward the indication received from the first unit of the first node to the second unit of the second node.

22. A non-transitory, computer-readable medium storing computer-executable instructions that, when executed by processing circuitry, configure a first unit of a first node of a wireless network to perform the method of claim 1.

23. A centralized unit (CU) of a first node of a wireless network, the CU comprising communication interface circuitry and processing circuitry that are operatively coupled and are configured to perform the method of claim 13.

24. A non-transitory, computer-readable medium storing computer-executable instructions that, when executed by processing circuitry, configure a centralized unit (CU) of a first node of a wireless network to perform the method of claim 13.

\* \* \* \* \*